US012597176B2

(12) United States Patent
Roy et al.

(10) Patent No.: US 12,597,176 B2
(45) Date of Patent: Apr. 7, 2026

(54) IMAGE GENERATOR AND METHOD OF IMAGE GENERATION

(71) Applicant: RAKUTEN GROUP, INC., Tokyo (JP)

(72) Inventors: Hiya Roy, Tokyo (JP); Mitsuru Nakazawa, Tokyo (JP); Bjorn Stenger, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 124 days.

(21) Appl. No.: 18/029,093

(22) PCT Filed: Sep. 30, 2021

(86) PCT No.: PCT/JP2021/036195
§ 371 (c)(1),
(2) Date: Mar. 28, 2023

(87) PCT Pub. No.: WO2023/053364
PCT Pub. Date: Apr. 6, 2023

(65) Prior Publication Data
US 2024/0362831 A1 Oct. 31, 2024

(51) Int. Cl.
*G06T 11/00* (2026.01)
*G06T 7/11* (2017.01)
(Continued)

(52) U.S. Cl.
CPC .............. *G06T 11/001* (2013.01); *G06T 7/11* (2017.01); *G06V 10/454* (2022.01); *G06V 10/82* (2022.01);
(Continued)

(58) Field of Classification Search
CPC .................... G06T 11/001; G06T 7/11; G06T 2207/20084; G06T 2207/20132; G06V 10/454; G06V 10/82
See application file for complete search history.

(56) References Cited

U.S. PATENT DOCUMENTS 12,004,871 B1 * 6/2024 Fazeli .................. A61B 5/0064
12,406,023 B1 9/2025 Alvarez Lopez et al.
(Continued)

FOREIGN PATENT DOCUMENTS

CN 111629212 A 9/2020
CN 112802034 A 5/2021
(Continued)

OTHER PUBLICATIONS

Author = {Wu, Chenyun and Lin, Zhe and Cohen, Scott and Bui, Trung and Maji, Subhransu}, title = {PhraseCut: Language-Based Image Segmentation in the Wild}, month = {June}, year = {2020} (Year: 2020).*
(Continued)

*Primary Examiner* — Yu Chen
(74) *Attorney, Agent, or Firm* — HEA Law PLLC

(57) ABSTRACT
Provided is an information-processing device including: a CPU; and a memory storing instructions for causing the information-processing device, when executed by the CPU, to: output an intermediate heatmap for input of an input image by using at least one of a plurality of machine learning models; and generate a heatmap based on an attribute of the input image, which is provided independently of the input image, and the intermediate heatmaps.

17 Claims, 17 Drawing Sheets

(51) Int. Cl.
  G06V 10/44       (2022.01)
  G06V 10/82       (2022.01)

(52) U.S. Cl.
  CPC .............. *G06T 2207/20084* (2013.01); *G06T 2207/20132* (2013.01); *G06T 2207/30196* (2013.01)

(56)       References Cited

U.S. PATENT DOCUMENTS

| | | | |
|---|---|---|---|
| 2009/0208118 A1 | 8/2009 | Csurka | |
| 2015/0170053 A1* | 6/2015 | Miao | G06N 20/00 706/12 |
| 2017/0345196 A1* | 11/2017 | Tanaka | G06T 11/60 |
| 2019/0050681 A1 | 2/2019 | Tate | |
| 2019/0057515 A1 | 2/2019 | Teixeira et al. | |
| 2019/0370587 A1 | 12/2019 | Burachas et al. | |
| 2020/0074634 A1 | 3/2020 | Kecskemethy et al. | |
| 2020/0380302 A1* | 12/2020 | Nakazawa | G06F 18/2148 |
| 2021/0009080 A1 | 1/2021 | Hu et al. | |
| 2021/0133861 A1* | 5/2021 | Kumar | G06F 18/214 |
| 2021/0192772 A1 | 6/2021 | Tate | |
| 2021/0249118 A1* | 8/2021 | Papagiannakis | G16H 50/30 |
| 2021/0344936 A1 | 11/2021 | Liu | |
| 2021/0374403 A1* | 12/2021 | Yumiba | G06V 10/7715 |
| 2021/0390700 A1* | 12/2021 | Lee | G06F 18/25 |
| 2022/0138490 A1 | 5/2022 | Tate | |
| 2022/0180528 A1* | 6/2022 | Dundar | G06N 20/00 |
| 2022/0207875 A1* | 6/2022 | Kopparapu | G06N 20/00 |
| 2022/0269895 A1* | 8/2022 | Barkan | G06F 18/2113 |
| 2022/0269996 A1 | 8/2022 | Nogami | |
| 2022/0277472 A1* | 9/2022 | Birchfield | G06N 3/08 |
| 2022/0327155 A1* | 10/2022 | Luo | G06V 10/764 |
| 2022/0382802 A1* | 12/2022 | Sharifi | G06F 16/532 |
| 2022/0391771 A1* | 12/2022 | Huang | G06N 20/00 |
| 2023/0069310 A1* | 3/2023 | Myronenko | G06T 7/11 |
| 2023/0153374 A1* | 5/2023 | Podlozhnyuk | G06V 10/955 708/520 |
| 2023/0162051 A1* | 5/2023 | Lv | G06F 18/214 706/12 |
| 2023/0410484 A1* | 12/2023 | Udayamurthy | G06V 20/52 |
| 2024/0290054 A1* | 8/2024 | Yin | G06T 15/04 |

FOREIGN PATENT DOCUMENTS

| | | |
|---|---|---|
| JP | 2000-075889 A | 3/2000 |
| JP | 2019-032773 A | 2/2019 |
| JP | 2020-516427 A | 6/2020 |
| JP | 2020-149641 A | 9/2020 |
| JP | 2021-005301 A | 1/2021 |
| JP | 2021-081793 A | 5/2021 |
| JP | 2021-103347 A | 7/2021 |
| JP | 2021-516646 A | 7/2021 |
| WO | 2021/130856 A1 | 7/2021 |

OTHER PUBLICATIONS

Yu Xiang et al. "Subcategory-aware Convolutional Neural Networks for Object Proposals and Detection", arxiv.org, Cornell University Library, 201 Olin Library Cornell University Ithaca, NY 14853, Apr. 16, 2016, XP080695853, pp. 1-16.

Search Report of Dec. 15, 2023, for related EP Patent Application No. 21959402.5, pp. 1-11.

Wenguan Wang, Jianbing Shen, "Deep Cropping via Attention Box Prediction and Aesthetics Assessment", [online], International Conference on Computer Vision (ICCV-2017); Published Oct. 2017; Internet <URL:https://openaccess.thecvf.com/content_ICCV_2017/papers/Wang_Deep_Cropping_via_ICCV_2017_paper.pdf>, p. 1-9, cited in "Background Art Column" of the specification.

International Search Report for PCT/JP2021/036195 dated Nov. 22, 2021, p. 1-9.

Office Action of Jan. 10, 2023, for corresponding JP Application No. 2022-557886 with a partial translation of the Office Action, p. 1-5.

Chenyun Wu et.al. "PhraseCut: Language-based Image Segmentation in the Wild", arxiv.org, Cornell University Library, 201 Olin Library Cornell University Ithaca, NY 14853, Aug. 3, 2020, XP081731210, pp. 1-17.

Search Report of Sep. 11, 2023, for corresponding EP Patent Application No. 21950363.8, pp. 1-9.

Office Action of Jun. 10, 2025, for related U.S. Appl. No. 18/029,668, pp. 1-35.

Xiang et al. "Subcategory-aware Convolutional Neural Networks for Object Proposals and Detection", 2017 IEEE winter conference on applications of computer vision (WACV), IEEE, 2017, https://ieeexplore.ieee.org/abstract/document/7926691 (Year: 2017), pp. 1-10, dated Mar. 9, 2017.

Office Action of Dec. 3, 2025, for related U.S. Appl. No. 18/029,668, pp. 1-19.

\* cited by examiner

IMAGE GENERATOR AND METHOD OF IMAGE GENERATION

CROSS-REFERENCE TO RELATED APPLICATION

The present disclosure contains subject matter related to that disclosed in International Patent Application PCT/JP2021/036195 under the Patent Cooperation treaty filed in the Japan Patent Office on Sep. 30, 2021, the entire contents of which are hereby incorporated by reference.

BACKGROUND OF THE INVENTION

1. Field of the Invention

The present invention relates to an image generator, and a method of image generation.

2. Description of the Related Art

In Wenguan Wang, Jianbing Shen, "Deep Cropping via Attention Box Prediction and Aesthetics Assessment," [online], ICCV-2017, [retrieved on Aug. 13, 2021], Internet <URL: https://openaccess.thecvf.com/content_ICCV_2017/papers/Wang_Deep_Cropping_via_ICCV_2017_paper. pdf>, there is described so-called image cropping, that is, an image processing technology of extracting a principal portion in an image, which involves utilizing an attention map in a convolutional neural network to obtain an aesthetic value, and obtaining a frame of the principal portion to be extracted based on the aesthetic value.

SUMMARY OF THE INVENTION

There is provided an information-processing device including: a CPU; and a memory storing instructions for causing the information-processing device, when executed by the CPU, to: output an intermediate heatmap for input of an input image by using at least one of a plurality of machine learning models; and generate a heatmap based on an attribute of the input image, which is provided independently of the input image, and the intermediate heatmaps.

There is also provided an information-processing method of causing a computer to execute: outputting, through use of one or a plurality of machine learning models, one or a plurality of intermediate heatmaps for input of an input image; and generating a heatmap based on an attribute of the input image, which is provided independently of the input image, and the one or the plurality of intermediate heatmaps.

There is also provided a non-transitory computer-readable information recording medium storing an information-processing program for causing a computer to: output, through use of one or a plurality of machine learning models, one or a plurality of intermediate heatmaps for input of an input image; and generate a heatmap based on an attribute of the input image, which is provided independently of the input image, and the one or the plurality of intermediate heatmaps.

BRIEF DESCRIPTION OF THE DRAWINGS

FIG. 14 is a diagram for illustrating a functional configuration of the information-processing device according to a first embodiment of the present invention.

FIG. 15 is a diagram for illustrating a functional configuration of the information-processing device according to a second embodiment of the present invention.

DESCRIPTION OF THE EMBODIMENTS

In hitherto known technologies for the image cropping including the technology as disclosed in the related art, the position of the principal portion in the image is determined based on a single evaluation criterion (aesthetic value in the related art).

However, the principal portion of the image intrinsically varies in accordance with a purpose of application of this image. For example, when a photograph image obtained by capturing a scene is used as a landscape, the principal portion is to exist in a thing appearing in a background in the image, while when this photograph image is used as a portrait, the principal portion is to exist in a human image appearing in a foreground in the image. Similarly, when a photograph image obtained by capturing a person is used to identify the person, the principal portion is to exist in a face portion of the person, while when this photograph image is used to introduce fashion, the principal portion is to exist in clothes and accessories of the person in the image.

However, there has hitherto not been known a technology for appropriately executing the image cropping in accordance with the purpose of the image.

The present invention disclosed hereafter enables to appropriately execute image cropping in accordance with a purpose of an image.

Figure 1:
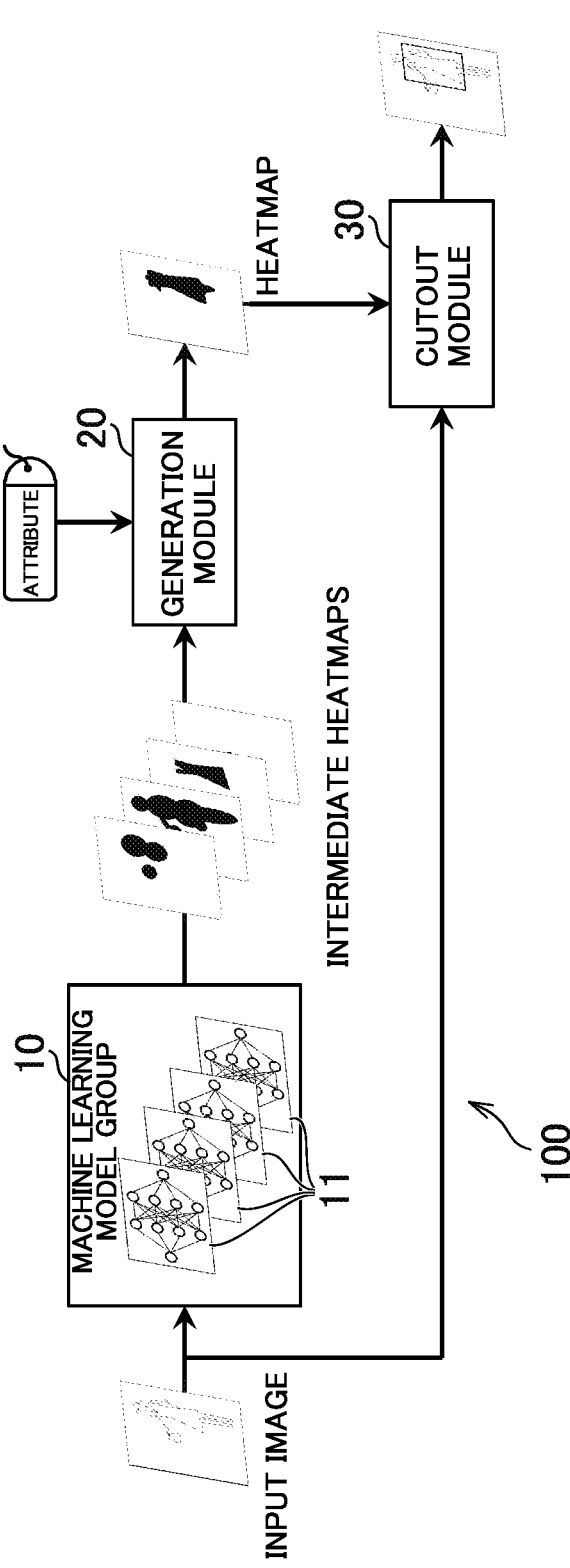
FIG. 1 is a functional conceptual diagram of an information-processing device conceptualized in common in various preferred embodiments of the present invention.

FIG. 1 is a functional conceptual diagram of an information-processing device 100 conceptualized in common in various preferred embodiments of the present invention. The information-processing device 100 is implemented by appropriate physical means, for example, a computer for executing an appropriate computer program, implementing functions of FIG. 1.

The information-processing device 100 is a type of an image processing device including a machine learning model group 10, a generation module 20, and a cutout module 30. More specifically, the machine learning model group 10 includes a plurality of learned machine learning models 11 each of which is capable of outputting an intermediate heatmap based on input of an input image. Whether or not the input image is input to all of the plurality of machine learning models 11 depends on a mode of implementation. When the input image is input to the plurality of machine learning models 11, the same number of intermediate heatmaps are obtained.

The generation module 20 generates a heatmap based on the at least one obtained intermediate heatmap. The generation module 20 usually combines the plurality of intermediate heatmaps by a predetermined method to obtain the heatmap, and directly or indirectly uses an attribute of the input image in this case. That is, the generation module 20 generates the heatmap based on the attribute of the input image and based on the intermediate heatmaps.

The information-processing device 100 may use the heatmap output from the generation module 20 as an end product. In this case, the information-processing device 100 includes, for example, at least two components being the machine learning model group 10 and the generation module 20. However, description is given below while assuming that the information-processing device 100 further includes the cutout module 30. The cutout module 30 cutouts a principal portion being a part of the input image based on the heatmap obtained by the generation module 20. That is, when the information-processing device 100 further includes the cutout module 30, the information-processing device 100 can be considered as a device which cuts out the principal portion of the input image based on the attribute of the input image.

Description is also given below of technical and practical significance of the above-mentioned information-processing device 100 and meanings of terms used in the present application.

Figure 2:
FIG. 2 is a view of an example of an input image.

FIG. 2 is a view of an example of an input image. A photograph of a person is illustrated in FIG. 2. However, what kind of subject is to be used is not particularly limited. Moreover, it does not matter whether the input image is acquired by actual capturing or by another method (such as an illustration). Moreover, a format of the input image is not particularly limited. Whether the input image is a raster image or a vector image, a resolution, and a format can be freely set. When the input image is input to the machine learning model group 10, however, the input image is at least prepared as electronic data.

Incidentally, an object of the information-processing device 100 is to cut out the principal portion of the input image as illustrated in FIG. 2, or to obtain a heatmap which can indicate the principal portion. However, it is actually impossible to universally define a "principal portion" even for the simple input image illustrated in the example.

Figure 3:
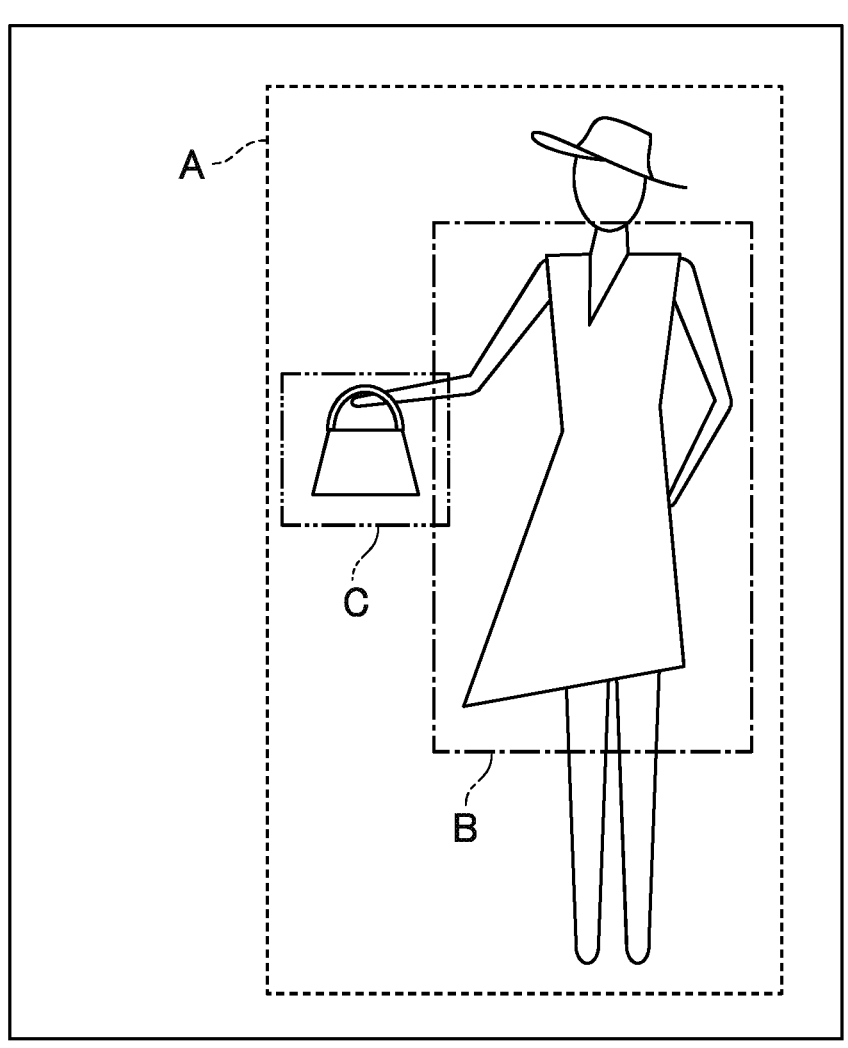
FIG. 3 is a view of examples of various "principal portions" of the input image.

This is because a "principal portion" of a certain input image can vary in accordance with how the input image is used. Specifically, when, for an input image of FIG. 3, which is the same as the input image of FIG. 2, a human image is required as the "principal portion," a region which is within a frame indicated by broken lines A of FIG. 3 and from which unnecessary margins are removed is considered as appropriate. However, when clothes and accessories (or fashion) are required as the "principal portion," a region which is within a frame indicated by one-dot chain lines B of FIG. 3 is appropriate as the "principal portion." When a bag is required as the "principal portion," a region which is within a frame indicated by two-dot chain lines C of FIG. 3 is appropriate.

Thus, it is required to define the "principal portion" of the input image based on information indicating how the input image is used. This information is provided by a certain method independently of the input image. This information is hereinafter referred to as "attribute" of the input image. In the case of FIG. 3, all of "human image," "clothes and accessories," and "bag" are a specific example of the attribute. The attribute of the input image may be provided based on structured data such as certain text data corresponding to the input image.

In the technical field of the image analysis, it is already known that it is possible to create an evaluation image numerically indicating evaluation in terms of importance of, as a unit, each pixel forming an image by preparing appropriate learning data. In the present application, this evaluation image is hereinafter referred to as "heatmap." A resolution of the heatmap is not always required to match that of the input image. An individual evaluation value may be indicated for a plurality of pixels, such as 3×3 pixels or 5×5 pixels.

However, a perspective (that is, attribute) based on which this heatmap is generated depends on the prepared learning data for the machine learning, and it is thus usually impossible to prepare a machine learning model which selects and outputs a heatmap from heatmaps different from one another in accordance with each of various attributes. It is possible to conceptualize a machine learning model which uses the attribute in addition to the input image as inputs and outputs the heatmap. However, it is not easy to prepare learning data for training such a machine learning model. Thus, in the information-processing device 100, as the machine learning model group 10, the plurality of learned machine learning models 11, implementation of which is relatively easy, are prepared.

The machine learning model 11 outputs not a finally required heatmap which can vary in accordance with the attribute of the input image, but a heatmap based on a specific perspective defined for each machine learning model 11. In the present application, the finally obtained heatmap which corresponds to the attribute of the input image is hereinafter simply referred to as "heatmap," and the heatmap which is based on a single perspective and is obtained by the individual machine learning model 11 is referred to as "intermediate heatmap." Both of those heatmaps are thus distinguished from each other. The intermediate heatmap corresponds to, for example, output of an attention map or an attention image generated through use of an attention model included in an individual machine learning model. In this case, the machine learning model uses the attention model to generate the output of, for example, the attention map or the attention image as the intermediate heatmap based on a feature amount map output from a feature extractor such as a convolutional neural network (CNN) included in this machine learning model. The attention map may be a map generated based on the attention model, or may be a map generated without being based on the attention model. For example, an attention map as an intermediate heatmap in CTR prediction or aesthetic value prediction corresponds to an attention map generated based on the attention model.

FIG. 4 to FIG. 7 are examples of the intermediate heatmap for the input image exemplified in FIG. 2.

Figure 4:
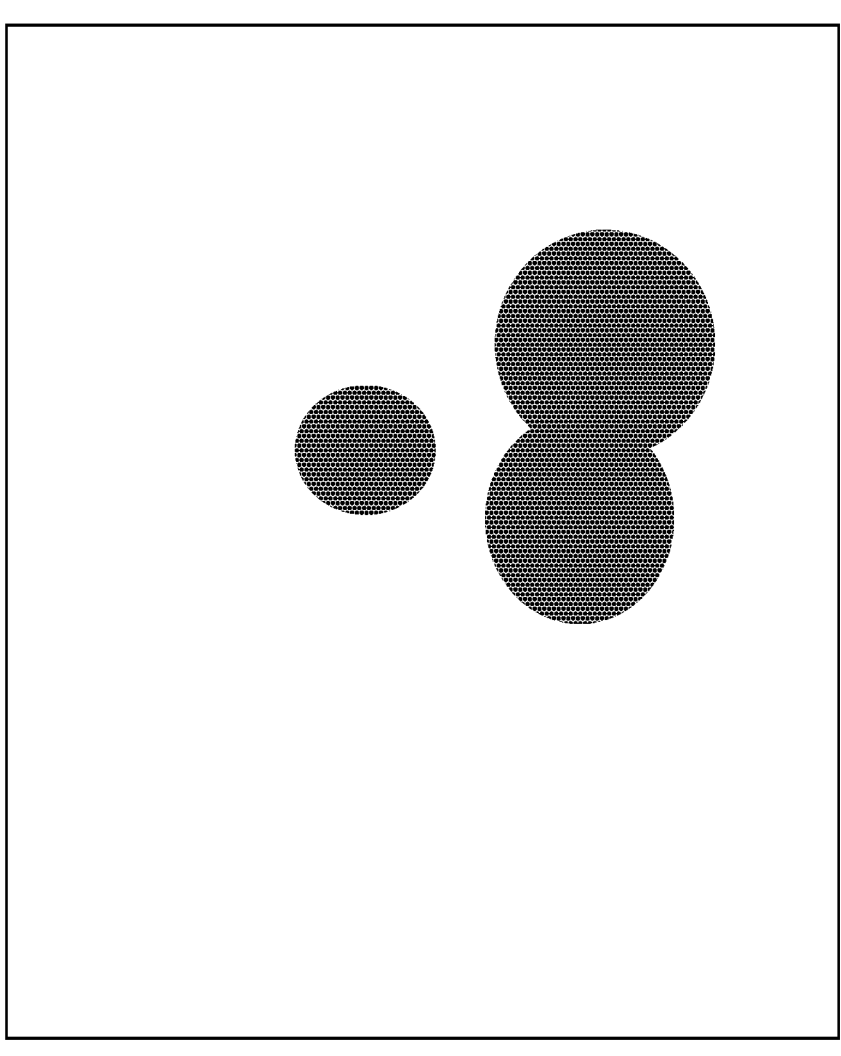
FIG. 4 is a view of an example of an intermediate heatmap indicating a CTR prediction.

The intermediate heatmap of FIG. 4 indicates the click through rate (CTR) prediction. The machine learning model

11 which outputs the CTR prediction as the intermediate heatmap can be obtained by being trained through use of, for example, the architecture of the machine learning known as CNN and an image annotated using scores corresponding to the CTR as the learning data. This learning data can be acquired by, for example, tracking a user operation on an image displayed on an electronic commerce (EC) website.

Figure 5:
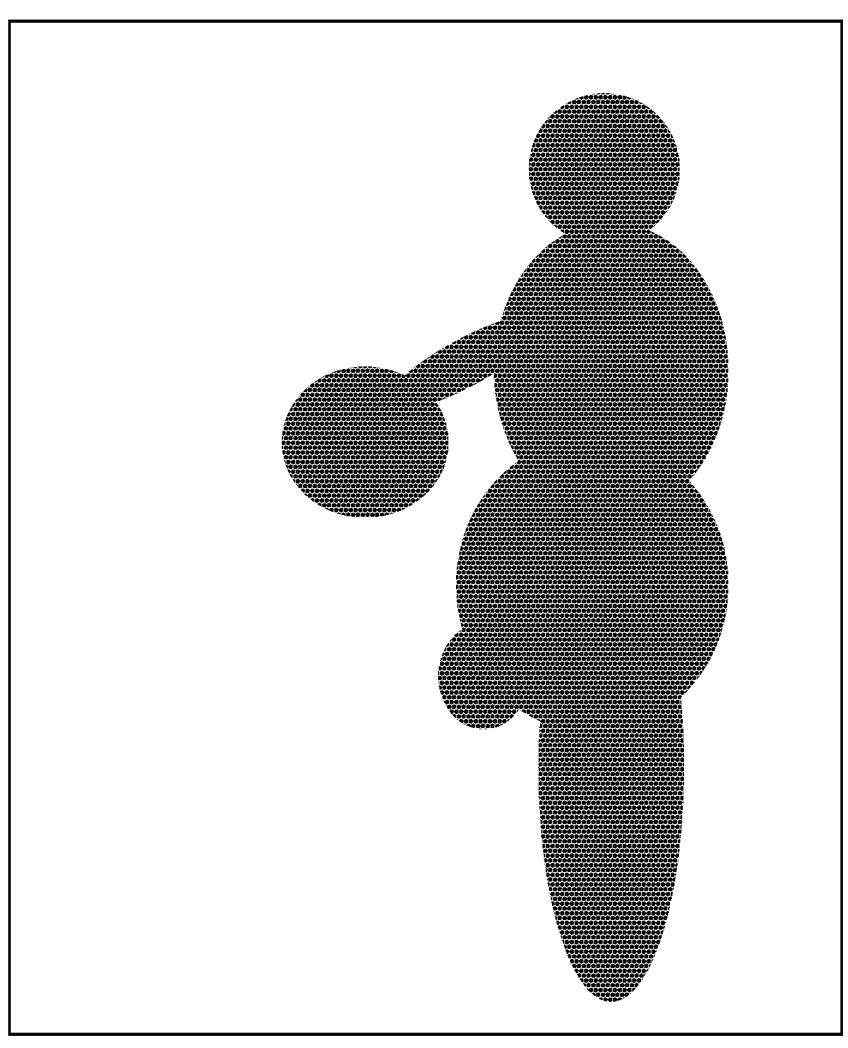
FIG. 5 is a view of an example of an intermediate heatmap indicating an aesthetic value.

The intermediate heatmap of FIG. 5 indicates the aesthetic value. As learning data for obtaining the machine learning model 11 which outputs the aesthetic value as the intermediate heatmap, learning data disclosed on the Internet for free or for a fee already exists for research purpose and practical applications. This learning data can accordingly be used to train the machine learning model 11, for example, a CNN to obtain this intermediate heatmap. In general, this learning data is created by, for example, giving, as the aesthetic value, a high evaluation to a portion which is likely to attract attention of a viewer in an image, and giving a low evaluation to a portion which is less likely to attract the attention of the viewer without specifically restricting an application and the like, to thereby annotate the image. The aesthetic value as used herein can be paraphrased as "aesthetic score."

Figure 6:
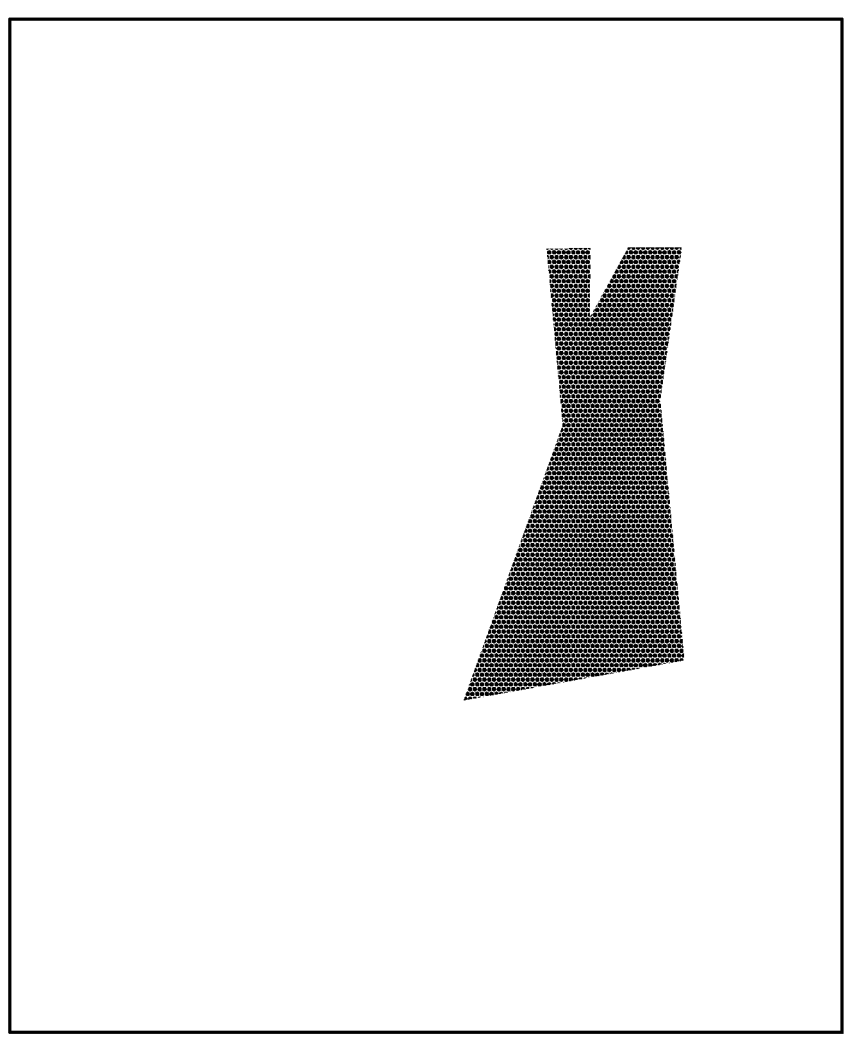
FIG. 6 is a view of an example of an intermediate heatmap indicating clothes and accessories.

The intermediate heatmap of FIG. 6 indicates clothes and accessories. That is, this intermediate heatmap is an image indicating a portion corresponding to "clothes and accessories" in the image, and indicates a region in which clothes worn by a person in the input image appear. In order to obtain the machine learning model 11 which outputs this intermediate heatmap, dedicated learning data may be created exhaustively. However, as a simpler way, for example, regions of any image are extracted and labeled through use of the segmentation technology for image, and data on regions labeled as "clothes" are used as the learning data, to thereby train the machine learning model 11. As this segmentation technology for image, technologies known as R-CNN and Faster R-CNN are famous, and such technologies may be used. As another example, the R-CNN or the Faster R-CNN may directly be used as the machine learning model 11 to extract only the data on the regions labeled as "clothes," and the extracted data may be used as the intermediate heatmap.

Figure 7:
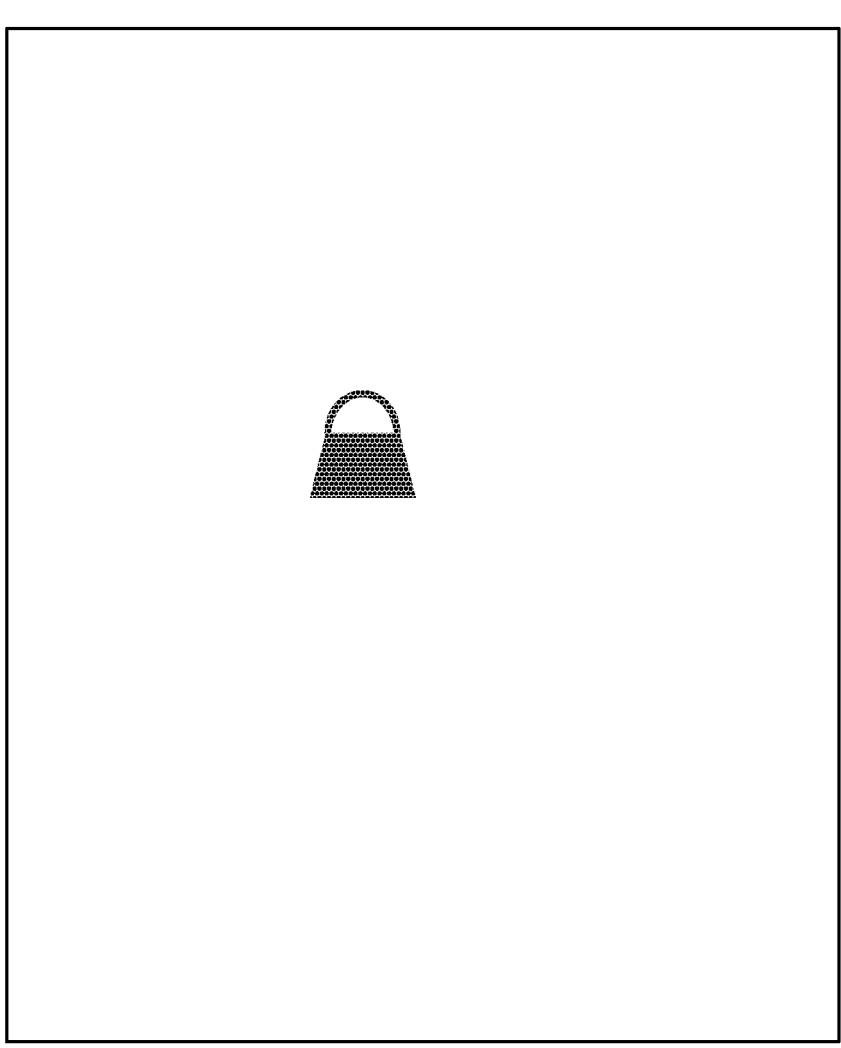
FIG. 7 is a view of an example of an intermediate heatmap indicating a bag.

The intermediate heatmap of FIG. 7 indicates a bag, which means that this intermediate heatmap indicates a region of the input image in which the bag appears. In order to obtain the machine learning model 11 which outputs this intermediate heatmap, processing equivalent to that described for the clothes of FIG. 6 is only required to be performed for the bag.

Similarly, any required number of types of machine learning models 11 are prepared, to thereby obtain intermediate heatmaps of the required number of types. In the examples of the intermediate heatmap of FIG. 4 to FIG. 7, the intermediate heatmaps are indicated as binary images for the convenience of illustration. However, the heatmap is not limited to those examples, and may be grayscale images having any number of bits.

Moreover, the machine learning model 11 is described to use the CNN in the above-mentioned example. However, the architecture of the machine learning model is not limited to this example. The architecture may use not only the deep neural network (DNN) such as the CNN, but also another machine learning method. The architectures of intermediate heatmap to be obtained, that is, the architectures of the machine learning models 11 may be different from each other. Moreover, the format of the input image is converted in accordance with the machine learning model 11 to which the input image is to be input. For example, the input image is converted to a raster image having a predetermined size and a predetermined resolution.

The plurality of obtained intermediate heatmaps are passed to the generation module 20. The generation module 20 creates the heatmap from the plurality of intermediate heatmaps directly or indirectly based on the attribute. As used herein, "directly based on the attribute" means using the attribute in a certain form when the heatmap is created from the plurality of intermediate heatmaps passed to the generation module 20, for example, when the heatmap is created through, for example, the combination from the plurality of intermediate heatmaps, selecting intermediate heatmaps used for the combination in accordance with the attribute or changing the weights for the combination in accordance with the attribute. In contrast, "indirectly based on the attribute" means passing a plurality of intermediate heatmaps prepared in advance by using the attribute in a certain form to the generation module 20, and using the passed intermediate heatmaps to create the heatmap, such as selecting the intermediate heatmaps created to be passed to the generation module 20 in accordance with the attribute in the first place.

Figure 8:
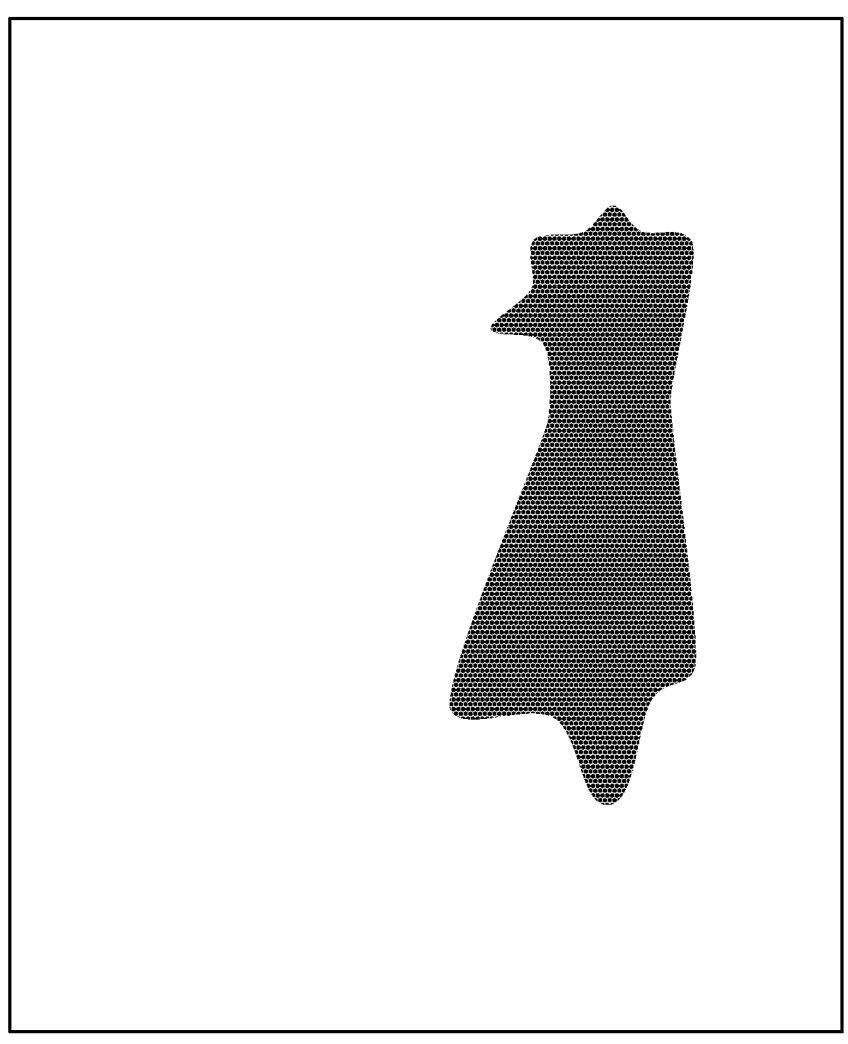
FIG. 8 is a view of an example of a generated heatmap.
Figure 9:
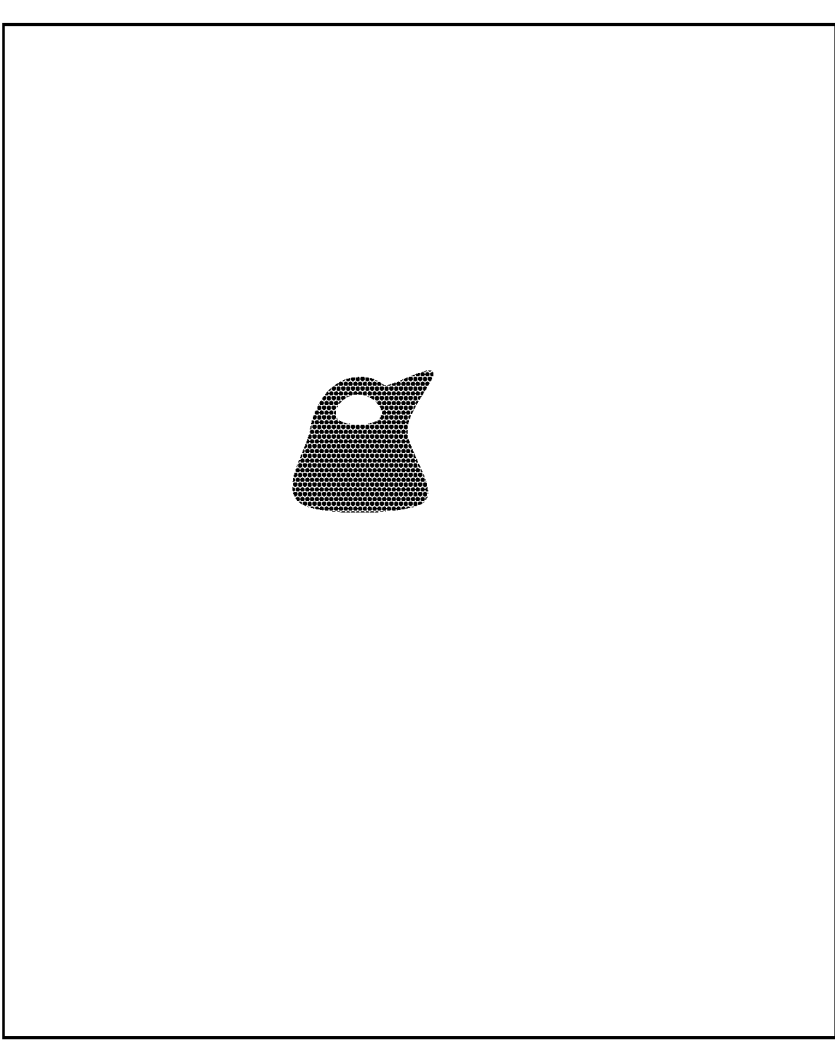
FIG. 9 is a view of an example of the generated heatmap.

FIG. 8 and FIG. 9 are views of examples of the heatmaps generated by the generation module 20. The heatmap of FIG. 8 is generated when the clothes are specified as the attribute. The heatmap of FIG. 9 is generated when the bag is specified as the attribute. Both of the heatmaps are generated based on the input image of FIG. 2, and it is understood that the heatmaps completely different from each other are generated when the specified attributes are different from each other. Meanwhile, for example, when the heatmap of FIG. 8 and the intermediate heatmap indicating the clothes of FIG. 6 are compared with each other, both thereof are not the same. That is, a region in which only the clothes appear is indicated in the intermediate heatmap of FIG. 6, while a region which is centered around the portion of the clothes and also includes a moderate region therearound is indicated in the heatmap of FIG. 8. It is thus understood that when the input image is used as an image indicating the cloth, the appropriate region is selected as a region indicating a principal portion of this image. Also in the heatmap of FIG. 9, it is understood that a region considered as appropriate is similarly selected appropriately.

The cutout module 30 cuts out a principal portion being a part of the input image based on the heatmap generated by the generation module 20. As used herein, the term "cutout" means specification of a position and a shape of the principal portion being a part of the input image, and it is not necessarily required to delete portions other than the principal portion from the image data itself of the input image. This is because, even when all of the image data of the input image is stored, as long as the position and the shape of the principal portion are specified, only the principal portion can be displayed when the image is displayed. In examples of the present application, the shape of the principal portion is rectangular, but the shape of the principal portion may be any shape such as an ellipsoid, a star shape, and another irregular shape.

Figure 10:
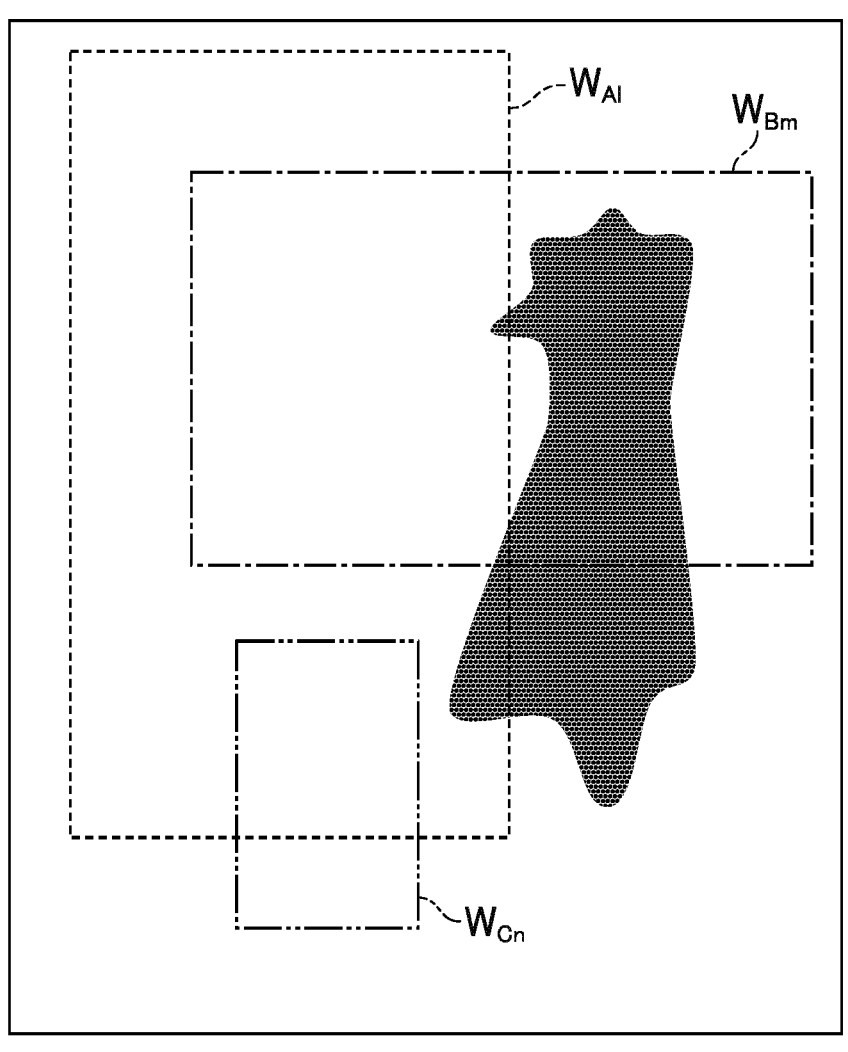
FIG. 10 is a view for illustrating an example of processing executed by a cutout module.

FIG. 10 is a view for illustrating an example of the processing executed by the cutout module 30. A method described now uses a method called "sliding window." First, the cutout module 30 sets, to the heatmap, various cutout windows W different in size and shape. For example, all of $W_{Al}$, $W_{Em}$, and $W_{Cn}$ of FIG. 10 are one of the cutout windows W. In this notation, each of first suffixes (A, B, C, . . . ) of W indicates the size and the shape of the cutout window W, and each of second suffices (1, m, n, . . . ) indicates the position of the cutout window W on the heatmap.

That is, for example, "1" cutout windows $W_A$ which have a certain size and shape and are shifted in position are set as $W_{A1}, \ldots, W_{Al}$ so that the entire region on the heatmap is covered. Similarly, "m" cutout windows $W_B$ and "n" cutout windows $W_C$ are set. Only the three types being $W_A$ to $W_C$ are described as the sizes and the shapes of the cutout window W for the convenience of description, but, in a case of cutout windows of a larger number of types in size and shape, those cutout windows are also similarly set.

Of the cutout windows W set in this way, windows W which satisfy the following condition are extracted as candidate windows $W_{cand}$.

$$W_{cand} = [W] \left\{ \sum_{X \in W} P(x) > \lambda \sum_x P(x) \right\} \qquad \text{[Expression 1]}$$

In Expression (1), "x" is a pixel included in the heatmap, P(x) is a value of the heatmap at the pixel "x", and $\lambda$ is any threshold value, and satisfies $0 < \lambda > 1$. That is, Expression 1 consequently expresses that a cutout window W having a ratio of a sum of the values of pixels "x" included in the cutout window W to a sum of the values of all of the pixels "x" of the heatmap larger than $\lambda$ is extracted as the candidate window $W_{cand}$. The value of $\lambda$ may be given as any fixed value, for example, 0.7, or there may be provided such setting that any ratio, for example, 5% of top cutout windows W in terms of the ratio of the sum are extracted as candidate windows $W_{cand}$ from all of the cutout windows W.

After that, from the candidate windows $W_{cand}$, a candidate window $W_{cand}$ appropriate as a principal portion $W_{opt}$ is selected. As an example, a method given by Expression 2 may be used.

$$W_{opt} = \underset{W \in W_{cand}}{\text{argmin}} |W| \qquad \text{[Expression 2]}$$

Figure 11:
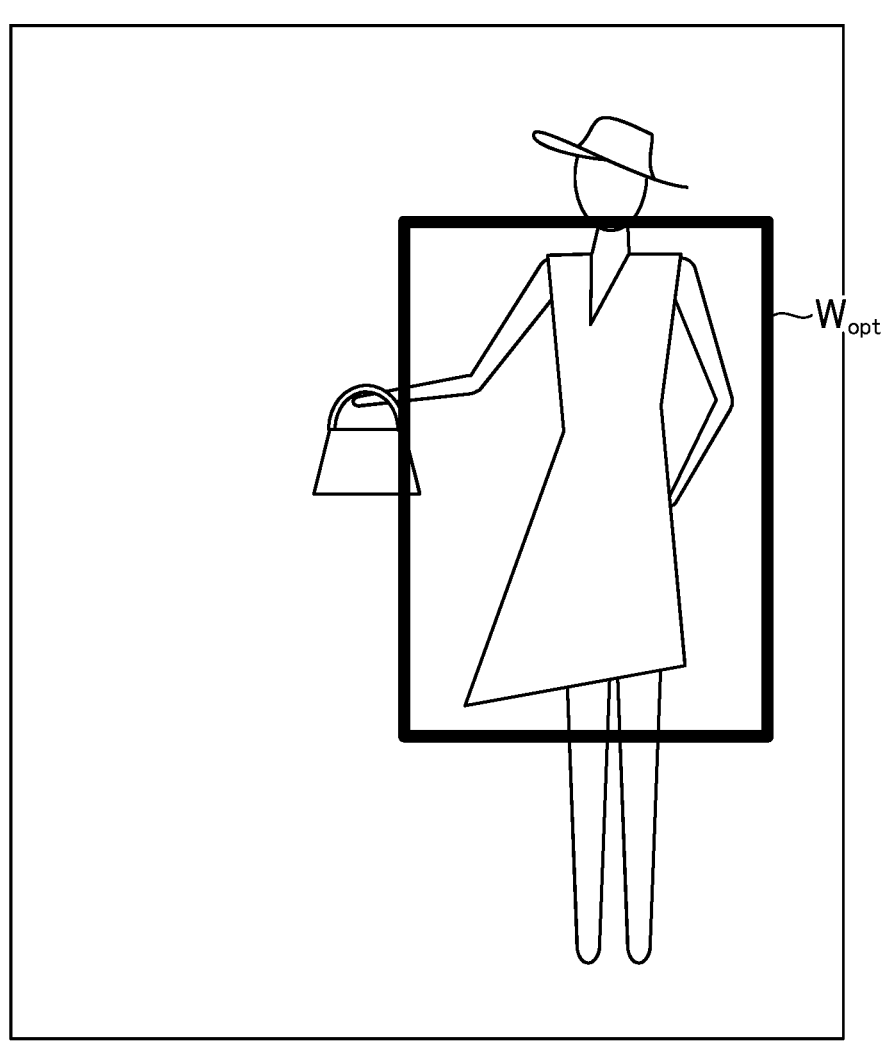
FIG. 11 is a view of an example of an obtained principal portion.

In Expression 2, |W| indicates the number of pixels included in the cutout window W, and Expression 2 consequently expresses that a cutout window W having the smallest size is selected out of the cutout windows W included in the candidate windows $W_{cand}$. In the manner described above, the principal portion $W_{opt}$ is finally obtained, for example, as illustrated in FIG. 11, and an image obtained by extracting only the portion considered as important from the input image is obtained by applying trimming having this principal portion $W_{opt}$ as an outer frame to the input image.

The method of selecting a portion appropriate as the principal portion $W_{opt}$ from the cutout windows W included in the candidate windows $W_{cand}$ is not limited to the above-mentioned method. For example, the machine learning model 11 which outputs the aesthetic value described with reference to FIG. 5 may be used to select a cutout window W which includes the highest aesthetic value out of the cutout windows W included in the candidate windows $W_{cand}$ as given by Expression 3.

$$W_{opt} = \underset{W \in W_{cand}}{\text{argmax}} \; Q(W) \qquad \text{[Expression 3]}$$

In Expression (3), Q(W) indicates the aesthetic value in the intermediate heatmap relating to the aesthetic value. That is, Expression 3 expresses that a cutout window W which includes the highest aesthetic value is selected from the cutout windows W included in the candidate windows $W_{cand}$. In this embodiment, a certain score based on a total of one or a plurality of scores for the cutout window W may be treated as the aesthetic value in Expression 3.

Figure 12:
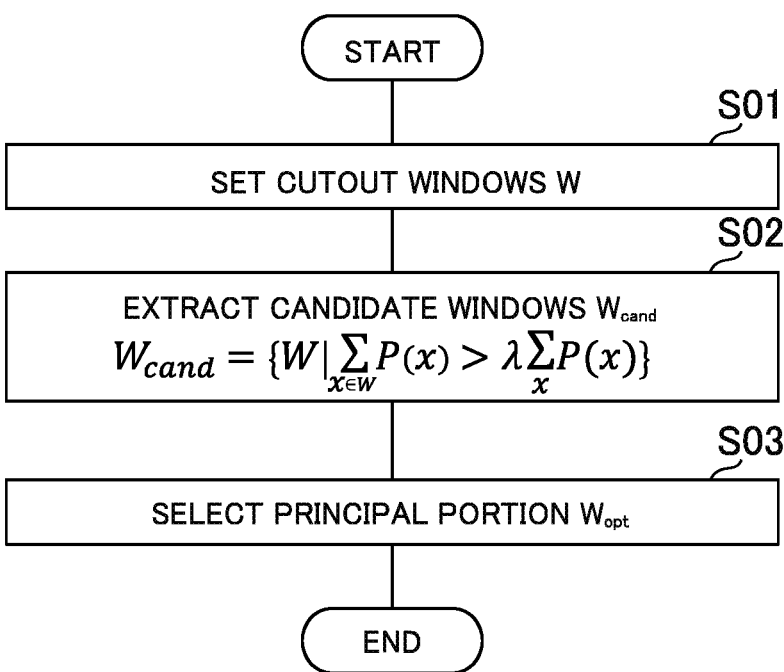
FIG. 12 is a flowchart for illustrating a processing flow executed by the cutout module.

FIG. 12 is a flowchart for illustrating a processing flow executed by the cutout module 30 in the above-mentioned examples. When the cutout module 30 starts the processing, the cutout module 30 sets the cutout windows W having various sizes, shapes, and positions as described above in Step S01, and extracts candidate windows $W_{cand}$ by the method given by Expression 1 or another similar method in Step S02. After that, in Step S03, the cutout module 30 selects a candidate window $W_{cand}$ appropriate as the principal portion $W_{opt}$ by the method given by Expression 2 or Expression 3, or another method. The size, the shape, and the position of the frame indicated by the selected principal portion $W_{opt}$ indicates the region to be cut out from the input image.

As another example, the cutout module 30 may execute other processing to obtain the principal portion $W_{opt}$. As an example, a machine learning model, preferably a learned R-CNN may be used to directly output the size, the shape, and the position of the principal portion $W_{opt}$ from the heatmap. In order to obtain this machine learning model, it is only required to execute training through use of learning data indicating various examples of a heatmap and corresponding principal portions $W_{opt}$. In order to obtain this learning data, the method called "sliding window" described as the processing executed by the cutout module 30 may be used.

Figure 13:
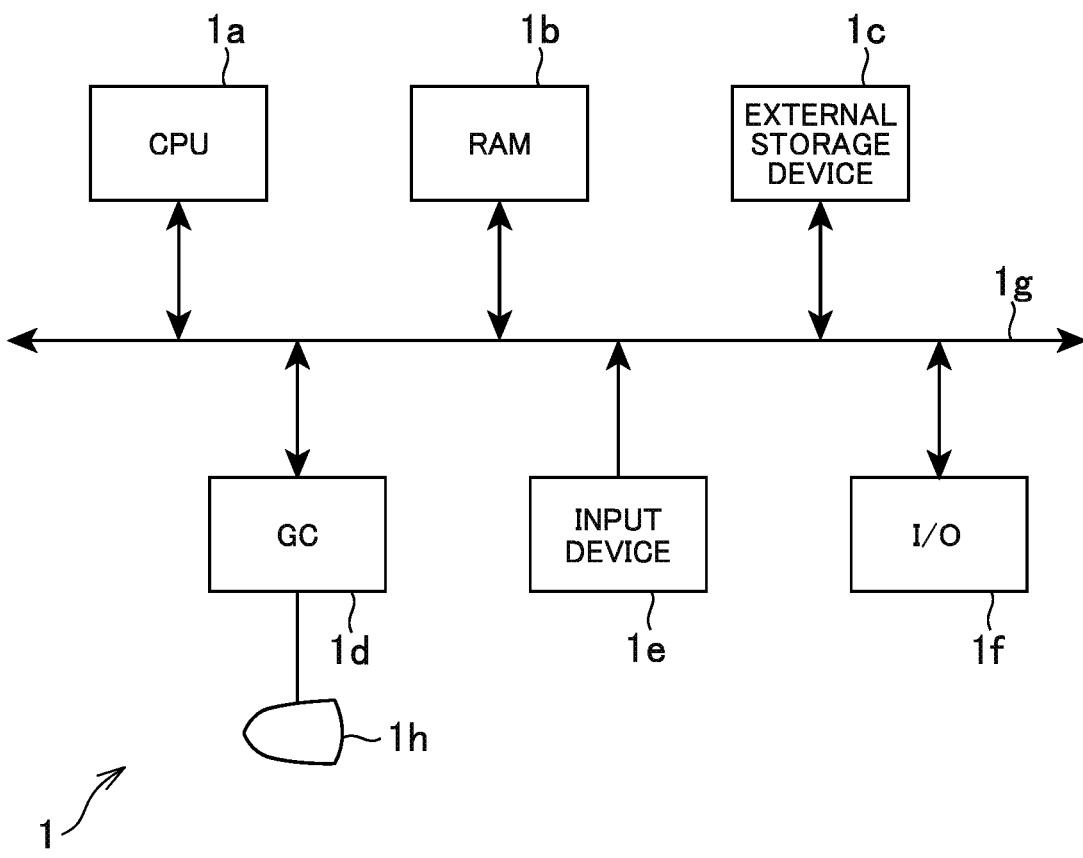
FIG. 13 is a configuration diagram for illustrating a representative physical configuration of a general computer.

The information-processing device 100 described above may be physically implemented through use of a general computer. FIG. 13 is a configuration diagram for illustrating a representative physical configuration of such a general computer 1.

In the computer 1, a central processing unit (CPU) 1a, a random access memory (RAM) 1b, an external storage device 1c, a graphics controller (GC) 1d, an input device 1e, and an input/output (I/O) 1f are connected through a data bus 1g so that electrical signals can mutually be transmitted and received. In this configuration, the external storage device 1c is a device which can statically record information, such as a hard disk drive (HDD) or a solid state drive (SSD). Moreover, the signal from the GC 1d is output to a monitor 1h for a user to visually recognize an image, such as a cathode ray tube (CRT) or a so-called flat panel display, and is displayed as an image. The input device 1e is a device for the user to input information, such as a keyboard, a mouse, or a touch panel. The I/O 1f is an interface for the computer 1 to transmit and receive information to and from external devices. A plurality of CPUs 1a may be prepared so that parallel computing is executed in accordance with a load of the information processing required to be executed by the computer 1.

An application program including an instruction sequence for causing the computer 1 to function as the information-processing device 100 is installed in the external storage device 1c, is read out onto the RAM 1b as required, and is executed by the CPU 1a. Moreover, this program may be recorded in an appropriate computer-readable information recording medium such as an appropriate optical disc, magneto-optical disc, or flash memory, and may then be provided, or may be provided through an information communication line such as the Internet. Moreover, the interface to be used by the user of the information-processing device 100 may be implemented on the computer 1 itself, and the user may directly operate the computer 1, may be implemented by a method of the so-called cloud computing in which general-purpose software such as a web browser is used on another computer and a function is provided from the computer 1 through the I/O 1f, or may further be implemented so that the computer 1 provides an application programing interface (API) available for another computer so that the computer 1 operates as the information-processing device 100 in response to a request from the another computer.

An overall description has been given of the information-processing device 100 conceptualized in common in various embodiments of the present invention described below. Description is now individually given of more specific embodiments of the information-processing device 100.

Figure 14:
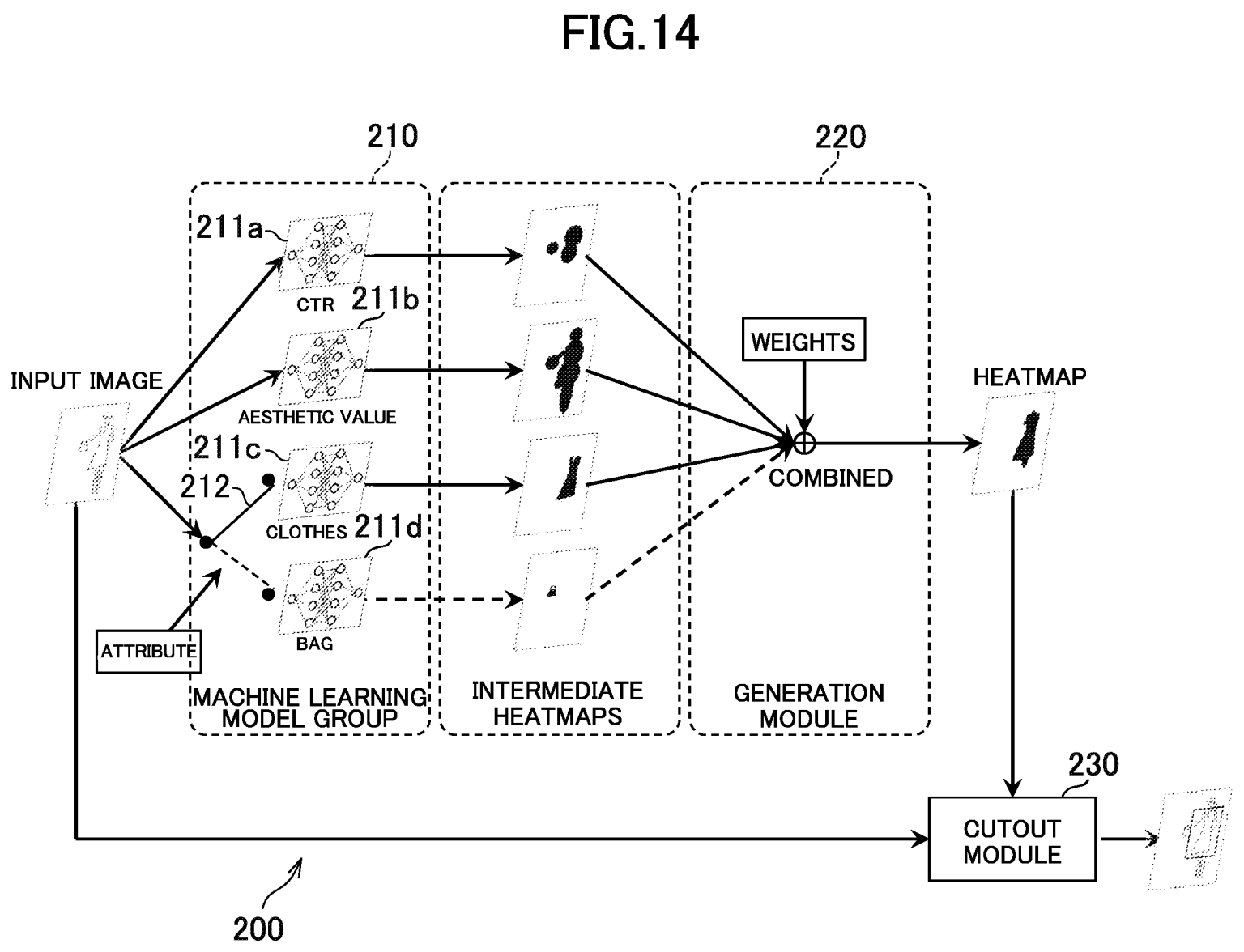

FIG. 14 is a diagram for illustrating a functional configuration of an information-processing device 200 according to a first embodiment of the present invention. The first embodiment is an example in which the heatmap is generated indirectly based on the attribute of the input image in a generation module 220.

The information-processing device 200 is configured to select, based on the attribute of the input image, at least a plurality of machine learning models 211 included in a machine learning model group 210, which are machine learning models 211c and 211d in the example of FIG. 14. That is, whether the input image is input to the machine learning model 211c which outputs an intermediate heatmap of the clothes or to the machine learning model 211d which outputs an intermediate heatmap of the bag is switched in accordance with the attribute.

In FIG. 14, "clothes" are given as the attribute. Thus, the machine learning model 211c is selected, and the intermediate heatmap relating to the clothes is output. Meanwhile, the machine learning model 211d is not selected, and the intermediate heatmap relating to the bag is not generated. This selection is made by a machine learning model selection module 212 schematically illustrated as a switch in FIG. 14. The machine learning model selection module 212 selects, as a machine learning model to which the input image is to be input, at least one machine learning model of the plurality of machine learning models, that is, the machine learning model 211c and the machine learning model 211d in this case. In FIG. 14, the state in which the machine learning model 211d is not selected is indicated by the broken lines.

Meanwhile, the selection of machine learning models 211a and 211b based on the attribute is not made, and the machine learning models 211a and 211b are configured to always output intermediate heatmaps.

This configuration is only required to be adjusted in accordance with, for example, a specific purpose of the information-processing device 200. For example, the machine learning models which are not selected based on the attribute and are always used may exist or may not exist. The number of machine learning models selected based on the attribute is not limited. Moreover, a plurality of machine learning models may be selected for a specific attribute, and the number of selected machine learning models may vary in accordance with each attribute. In this embodiment, as one example, the machine learning models which output intermediate heatmaps relating to the CTR and the aesthetic value are treated as the machine learning models which are not selected based on the attribute, and the machine learning models which output the intermediate heatmaps relating to the clothes and the bag are treated as the machine learning models which are selected based on the attribute.

The obtained intermediate heatmaps are as many as the machine learning models 211a to 211c to which the input image is input. The intermediate heatmaps are combined by the generation module 220, to thereby obtain a final heatmap. This method for the combination is not particularly limited, and, as an example, there is given a method of multiplying each intermediate heatmap by an appropriate weight, and summing the products. That is, a finally obtained heatmap $H_0$ is obtained by a method given by Expression 4.

$$H_0 = \sum_k w_k H_k \qquad \text{[Expression 4]}$$

In Expression 4, $H_k$ is a k-th intermediate heatmap, and $w_k$ is a weight coefficient for each intermediate heatmap. The weight coefficient $w_k$ may dynamically be defined as in a third embodiment described later, or may be given in advance as a fixed value. For example, the weight coefficient $w_k$ may be set to 0.3 for the intermediate heatmap relating to the CTR and the aesthetic value, and may be set to 0.4 for the intermediate heatmaps relating to the clothes and the bag.

The cutout module 230 cutouts a principal portion being a part of the input image based on the heatmap obtained as described above. This cutout processing may be the same as the cutout processing already described as common processing in the embodiments.

Figure 15:
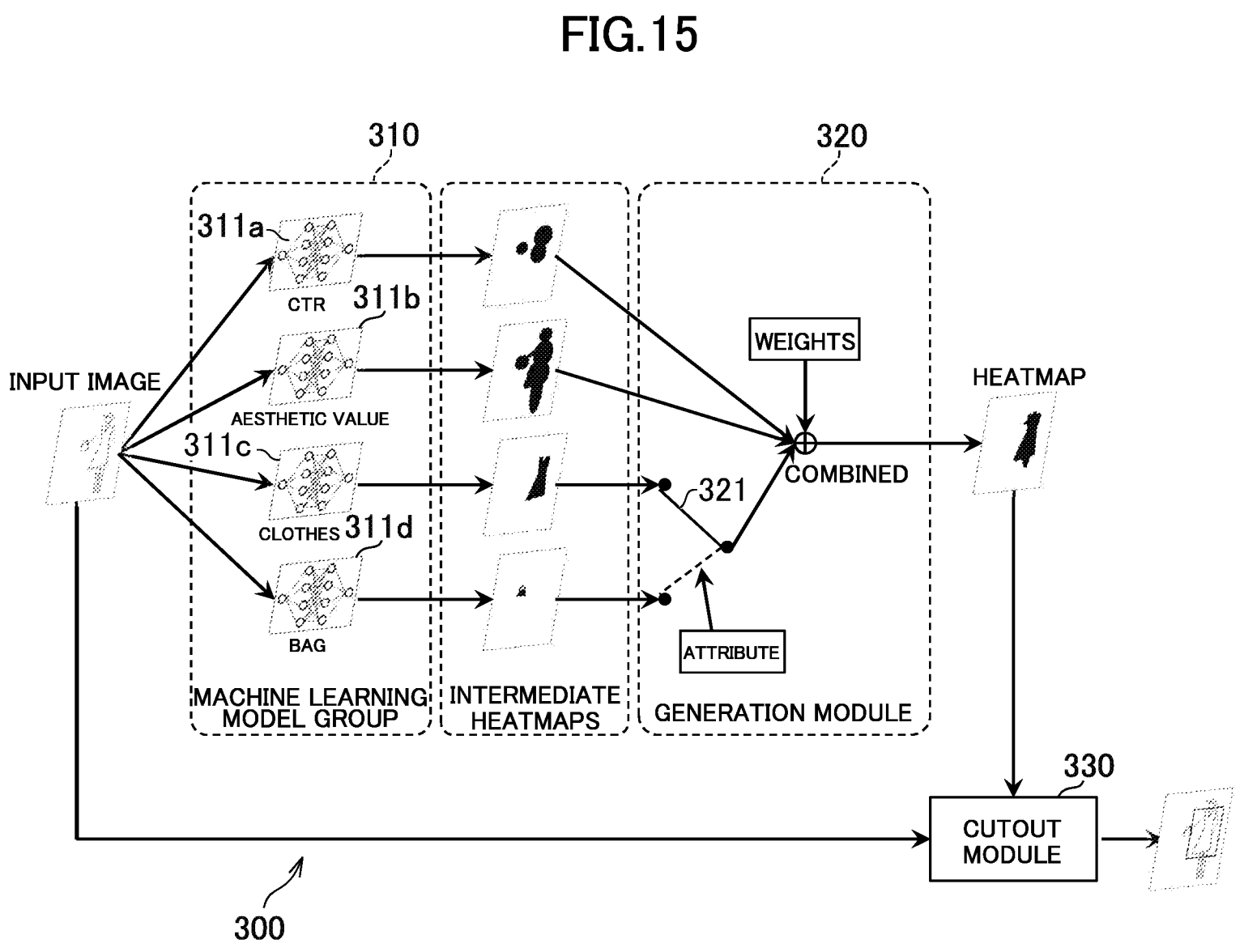

FIG. 15 is a diagram for illustrating a functional configuration of an information-processing device 300 according to a second embodiment of the present invention. The second embodiment is an example in which the heatmap is generated directly based on the attribute of the input image in a generation module 320.

The information-processing device 300 is configured to select at least one intermediate heatmap from a plurality of intermediate heatmaps. That is, any one of the intermediate heatmap of the clothes and the intermediate heatmap of the bag is selected by an intermediate heatmap selection module 321 schematically indicated as a switch in FIG. 15. This selection is made based on the attribute, and the intermediate heatmap which is not selected is not used in the generation module 320.

In FIG. 15, "clothes" is given as the attribute. Thus, the intermediate heatmap of the clothes is selected, and the intermediate heatmap relating to the clothes is used for the combination for the finally obtained heatmap. Meanwhile, the intermediate heatmap relating to the bag is not selected, and is not used for this combination. In FIG. 15, the state in which the intermediate heatmap relating to the bag is not selected is indicated by the broken line.

Meanwhile, the selection of the intermediate heatmaps relating to the CTR and the aesthetic value based on the attributes is not made, and the intermediate heatmaps are configured as the intermediate heatmaps always used for the combination for the finally obtained heatmap.

This configuration is also only required to be adjusted in accordance with, for example, a specific purpose of the information-processing device 300. For example, the intermediate heatmaps which are not selected based on the attribute and are always used may exist or may not exist. The number of intermediate heatmaps selected based on the attribute is not limited. Moreover, a plurality of intermediate heatmaps may be selected for a specific attribute, and the number of selected intermediate heatmaps may vary in accordance with each attribute.

The number of intermediate heatmaps which include the selected intermediate heatmaps and are used for the combination for the heatmap is equal to or less than the number of machine learning models 311a to 311d to which the input image is input. The intermediate heatmaps are combined by the generation module 320, to thereby obtain the final heatmap. A method for this combination may be the same as that in the previous embodiment. Moreover, it is preferred that the cutout module 330 cutout a principal portion being a part of the input image based on the heatmap obtained as described above.

Figure 16:
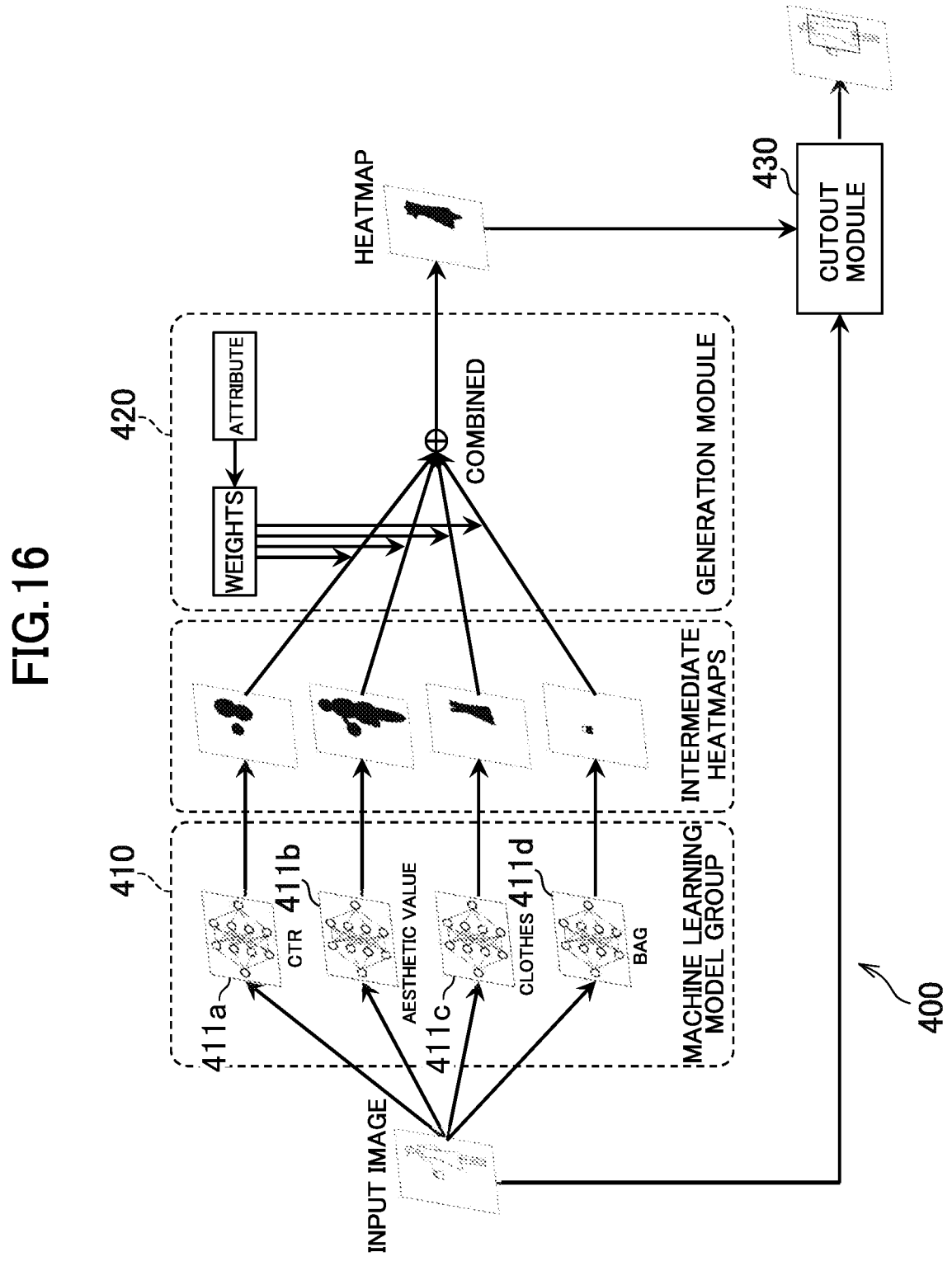
FIG. 16 is a diagram for illustrating a functional configuration of the information-processing device according to a third embodiment of the present invention.

FIG. 16 is a diagram for illustrating a functional configuration of an information-processing device 400 according to the third embodiment of the present invention. The first embodiment is another example in which the heatmap is generated directly based on the attribute of the input image in a generation module 420.

The information-processing device 400 is configured to use weights based on the attribute of the input image when the plurality of intermediate heatmaps are combined by the generation module 420 to generate the heatmap. That is, the input image is, in principle, input to a plurality of machine learning models 411a to 411d prepared in a machine learning model group 410, and as many intermediate heatmaps as the plurality of machine learning models 411a to 411d are obtained. The weights to be used when those intermediate heatmaps are combined are changed in accordance with the attribute.

That is, in the information-processing device 400, the generation module 420 generates at least a part of the weighs based on the attribute. Specifically, when the attribute is "clothes," the weights for the intermediate heatmaps relating to the CTR, the aesthetic value, the clothes, and the bag are assigned as 0.3, 0.3, 0.3, and 0.1, respectively. When the attribute is "bag," the weights are similarly assigned as 0.3, 0.3, 0.1, and 0.3, respectively. It is not always required that the attribute correspond to a specific machine learning model. For example, it is possible to provide "fashion item" as an attribute, and to assign the corresponding weights as 0.3, 0.3, 0.2, and 0.2.

Moreover, in the description given above, 0.3 is always assigned to the weights for the intermediate heatmaps of the CTR and the aesthetic value. For such an intermediate heatmap having the weight which does not depend on the attribute and is set to a fixed value, the weight may be given in advance as a constant.

As the machine learning model group 410 and a cutout module 430, a machine learning model group and a cutout module equivalent to those in the previous embodiments may be used.

In the information-processing device 400 according to the third embodiment, as described above for the information-processing device 200 according to the first embodiment with reference to FIG. 14, the machine learning model selection module 212 may be provided to select, based on the attribute, at least one machine learning model to be used as the machine learning model to which the input image is to be input. As another example, as described above for the information-processing device 300 according to the second embodiment with reference to FIG. 15, the intermediate heatmap selection module 321 may be provided to select at least one intermediate heatmap based on the attribute, and the selected at least one intermediate heatmap may be used by the generation module 420, or the configurations both thereof may be provided.

Figure 17:
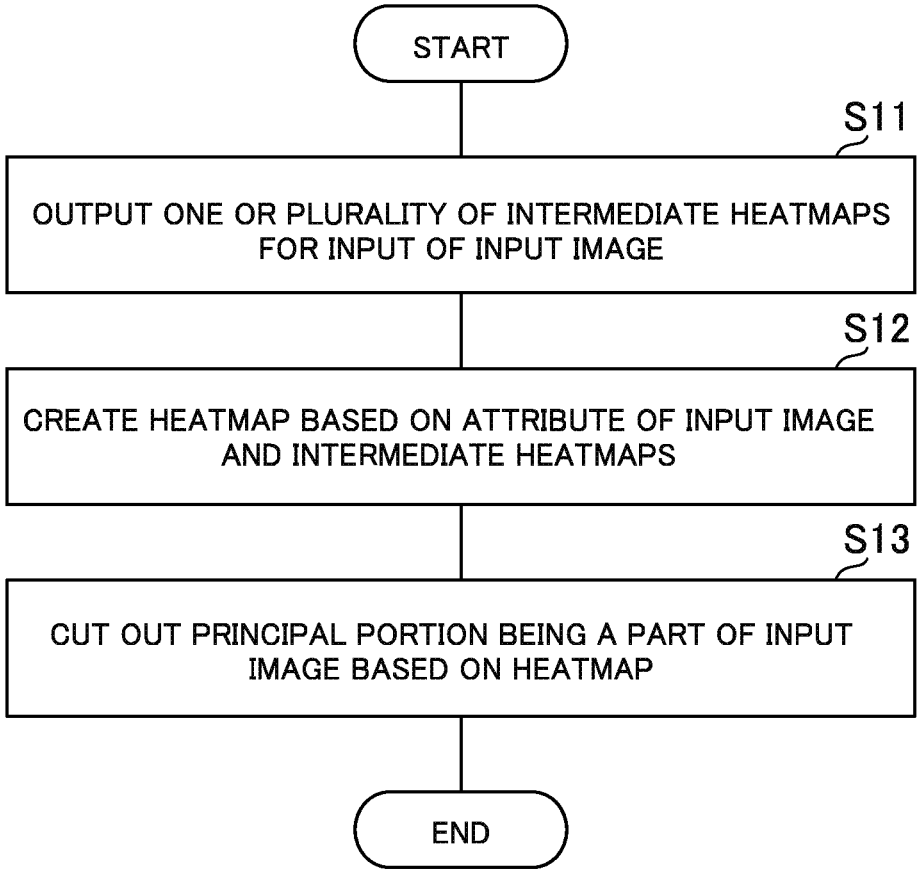
FIG. 17 is a flowchart for illustrating a common processing flow executed by the information-processing devices according to the present invention.

FIG. 17 is a flowchart for illustrating a common processing flow of an information-processing method executed by the information-processing devices 100 to 400 according to the respective embodiments of the present invention.

In this processing method, first, in Step S11, one or a plurality of intermediate heatmaps are output for the input of an input image. The processing in this step is executed by the machine learning model group 10 illustrated in FIG. 1 as being common in the embodiments, which has been described. Moreover, in each embodiment, the processing executed by each of the machine learning model group 210 of FIG. 14, the machine learning model group 310 of FIG. 15, and the machine learning model group 410 of FIG. 16 corresponds to this processing.

After that, in Step S12, a heatmap is generated based on the attribute of the input image and the intermediate heatmaps. The processing in this step is executed by the generation module illustrated in FIG. 1 as being common in the embodiments, which has been described. In each embodiment, the processing executed by each of the generation module 220 of FIG. 14, the generation module 320 of FIG. 15, or the generation module 420 of FIG. 16 corresponds to this processing. Moreover, the point that the generation of the heatmap is executed based on the attribute of the input image is implemented by the machine learning model selection module 212 of FIG. 14 selecting the machine learning model in the first embodiment, the selection of the intermediate heatmaps by the intermediate heatmap selection module of FIG. 15 in the second embodiment, and the determination of the weights by the generation module 420 of FIG. 16 in the third embodiment.

Finally, in Step S13, the principal portion being a part of the input image is cut out based on the heatmap. The processing in this step is executed by the cutout module 30 illustrated in FIG. 1 as being common in the embodiments, which has been described. The processing executed by the cutout modules 230, 330, and 430 in the respective embodiments are equivalent to this processing.

What is claimed is:

1. An information-processing device, comprising:
a CPU; and
a memory storing instructions for causing the information-processing device, when executed by the CPU, to:
output an intermediate heatmap for input of an input image by using at least one of a plurality of machine learning models;
generate a heatmap based on an attribute of the input image and the intermediate heatmaps;
wherein the attribute of the input image is provided independently of the input image; and
wherein each of the plurality of machine learning models is configured to output the intermediate heatmap irrespective of any other machine learning models among the plurality of machine learning models.

2. The information-processing device according to claim 1, wherein the instructions further cause the information-processing device to:
select, as a machine learning model to which the input image is to be input, at least one machine learning model from the plurality of machine learning models based on the attribute.

3. The information-processing device according to claim 1, wherein the instructions further cause the information-processing device to:

select at least one intermediate heatmap from a plurality of the intermediate heatmaps output from the plurality of machine learning models based on the attribute.

4. The information-processing device according to claim 1, wherein the instructions further cause the information-processing device to:

generate the heatmap by giving a weight to each of a plurality of the intermediate heatmaps and combining the plurality of the weighted intermediate heatmaps.

5. The information-processing device according to claim 4, wherein the instructions further cause the information-processing device to:

determine at least a part of the weights based on the attribute.

6. The information-processing device according to claim 1, wherein the instructions further cause the information-processing device to:

cut out a principal portion being a part of the input image based on the heatmap.

7. The information-processing device according to claim 1, wherein the plurality of machine learning models includes at least one of a first machine learning model that outputs a click through rate prediction or a second machine learning model that outputs aesthetic values.

8. The information-processing device according to claim 1, wherein each of the plurality of machine learning models is configured to output a heatmap independent of the attribute.

9. The information-processing device according to claim 2, wherein at least one of the unselected machine learning models from the plurality of machine learning models does not generate a heat map.

10. The information-processing device according to claim 3, wherein only a subset of the plurality of generated intermediate heat maps are selected and used to generate the heatmap.

11. The information-processing device according to claim 6, wherein the instructions cause the information-processing device to:

cut out the principal portion using a sliding window by setting a plurality of windows; extracting a plurality of candidate windows among the plurality of windows; and selecting a candidate window among the plurality of candidate windows as the principal portion.

12. The information-processing device according to claim 6, wherein the instructions cause the information-processing device to:

cut out the principal portion using a machine learning model to directly output a size, a shape, and a position of the principal portion.

13. The information-processing device according to claim 1, wherein the heatmap is an evaluation image.

14. The information-processing device according to claim 1, wherein a resolution of the heatmap does not match a resolution of the input image.

15. The information-processing device according to claim 1, wherein the heatmap is a combination of a plurality of the intermediate heatmaps.

16. An information-processing method of causing a computer to execute:

outputting, through use of one or a plurality of machine learning models, one or a plurality of intermediate heatmaps for input of an input image;

generating a heatmap based on an attribute of the input image and the one or the plurality of intermediate heatmaps;

wherein the attribute of the input image is provided independently of the input image; and wherein each of the plurality of machine learning models is configured to output the intermediate heatmap irrespective of any other machine learning models among the plurality of machine learning models.

17. A non-transitory computer-readable information recording medium storing an information-processing program for causing a computer to:

output, through use of one or a plurality of machine learning models, one or a plurality of intermediate heatmaps for input of an input image;

generate a heatmap based on an attribute of the input image and the one or the plurality of intermediate heatmaps;

wherein the attribute of the input image is provided independently of the input image; and wherein each of the plurality of machine learning models is configured to output the intermediate heatmap irrespective of any other machine learning models among the plurality of machine learning models.

* * * * *